US 12,245,621 B2

(12) United States Patent
Bernard

(10) Patent No.: US 12,245,621 B2
(45) Date of Patent: Mar. 11, 2025

(54) SOLID FUNCTIONALLY IMPROVED ISOMALT

(71) Applicant: Südzucker AG, Mannheim (DE)

(72) Inventor: Jörg Bernard, Albsheim (DE)

(73) Assignee: Südzucker AG, Mannheim (DE)

( * ) Notice: Subject to any disclaimer, the term of this patent is extended or adjusted under 35 U.S.C. 154(b) by 1139 days.

(21) Appl. No.: 16/967,935

(22) PCT Filed: Feb. 5, 2019

(86) PCT No.: PCT/EP2019/052722
§ 371 (c)(1),
(2) Date: Aug. 6, 2020

(87) PCT Pub. No.: WO2019/154786
PCT Pub. Date: Aug. 15, 2019

(65) Prior Publication Data
US 2021/0360954 A1 Nov. 25, 2021

(30) Foreign Application Priority Data
Feb. 7, 2018 (DE) .......................... 102018201916.9

(51) Int. Cl.
*A23L 27/30* (2016.01)

(52) U.S. Cl.
CPC ........... *A23L 27/34* (2016.08); *A23V 2002/00* (2013.01)

(58) Field of Classification Search
CPC ..................................................... A23L 27/34
See application file for complete search history.

(56) References Cited

U.S. PATENT DOCUMENTS

| 4,117,173 A | 9/1978 | Schiweck et al. |
| 2007/0202243 A1* | 8/2007 | Arenz ....................... A23G 3/38 |
| | | 426/660 |
| 2009/0209662 A1* | 8/2009 | Kowalczyk .............. C07H 3/04 |
| | | 514/777 |

FOREIGN PATENT DOCUMENTS

| DE | 19747642 B4 | 5/1999 |
| EP | 0625578 | 11/1994 |
| EP | 1513942 B1 | 3/2005 |
| EP | 0859006 | 9/2006 |
| JP | 2015-218143 A | 12/2015 |
| WO | 1997008958 | 3/1997 |

OTHER PUBLICATIONS

International Search Report and Written Opinion for PCT/EP2019/052722 dated 13 pages.
European Pharmacopoeia 8.0, vol. 1, paragraph 2.9.36—Powder Flow, published Jul. 15, 2013.

* cited by examiner

*Primary Examiner* — Jeffrey P Mornhinweg
(74) *Attorney, Agent, or Firm* — Sheppard Mullin Richter & Hampton LLP

(57) ABSTRACT

The present invention relates to a solid isomalt composition, which comprises 6-O-alpha-D-glucopyranosyl-D-sorbitol (1,6-GPS) and 1-O-alpha-D-glucopyranosyl-D-mannitol (1,1-GPM) and the additional glycosylated isomalt components 1-O-(6'-O-alpha-D-glucopyranosyl)-alpha-D-glucopyranosyl-D-mannitol (6'-g-1,1-GPM), 6-O-(6'-O-alpha-D-glucopyranosyl)-alpha-D-glucopyranosyl-D-sorbitol (6'-g-1,6-GPS), 1,6-di-O-alpha-D-glucopyranosyl-D-sorbitol (1-g-1,6-GPS) and 1,6-di-O-alpha-D-glucopyranosyl-D-mannitol (6-g-1,1-GPM).

13 Claims, No Drawings

SOLID FUNCTIONALLY IMPROVED ISOMALT

This application is a U.S. National Stage Application under 35 U.S.C. 371 of International Application No. PCT/EP2019/052722, filed Feb. 5, 2019, which claims priority to German Patent Application 102018201916.9, filed Feb. 7, 2018. The contents of each of the aforementioned are hereby incorporated by reference in their entirety into the present disclosure.

The present invention relates to a solid isomalt composition, which comprises 6-O-alpha-D-glucopyranosyl-D-sorbitol (1,6-GPS) and 1-O-alpha-D-glucopyranosyl-D-mannitol (1,1-GPM) and the additional glycosylated isomalt components 1-O-(6'-O-alpha-D-glucopyranosyl)-alpha-D-glucopyranosyl-D-mannitol (6'-g-1,1-GPM), 6-O-(6'-O-alpha-D-glucopyranosyl)-alpha-D-glucopyranosyl-D-sorbitol (6'-g-1,6-GPS), 1,6-di-O-alpha-D-glucopyranosyl-D-sorbitol (1-g-1,6-GPS) and 1,6-di-O-alpha-D-glucopyranosyl-D-mannitol (6-g-1,1-GPM).

Isomalt (hydrogenated isomaltulose) is a sugar substitute which has 1,6-GPS and 1,1-GPM as main components, and which is advantageous due to its acariogenicity, its low calorific value and its suitability for diabetics.

DE 25 20 173 A1 relates to a method for producing 1,6-GPS and 1,1-GPM from isomaltulose and its use as a sugar substitute. EP 0 625 578 A1 discloses the production of isomalt and its use as a sweetener in various luxury food and food products.

EP 0 859 006 B2 and WO 1997/008958 A1 relate to methods for producing mixtures enriched with 1,6-GPS and 1,1-GPM, as well as 1,6-GPS and 1,1-GPM in pure form, and uses thereof.

Such isomalt compositions are used in many products, for example, in the luxury food and food sector. Depending on the end product, the associated consumer preferences and technological requirements, the wide range of applications of isomalt compositions requires particular flexibility with regard to the provision of different product properties. For example, certain end products and/or consumer preferences require dry isomalt compositions which have particularly good flowability and/or pourability, particularly after the isomalt compositions have been stored. The previously known isomalt compositions can be improved in terms of their flowability and pourability, particularly after the isomalt compositions have been stored.

Therefore, the technical problem addressed by the invention is that of providing a solid isomalt composition comprising 1,1-GPM and 1,6-GPS, as well as mixtures containing these sugar alcohols in larger quantities, which shows improved pourability and/or flowability.

The present invention solves the technical problem by providing a solid isomalt composition, wherein the solid isomalt composition has 1,1-GPM, 1,6-GPS and the glycosylated isomalt components 6'-g-1,1-GPM, 6'-g-1,6-GPS, 1-g-1,6-GPS, and 6-g-1,1-GPM, and wherein the weight ratio of 6'-g-1,1-GPM:6'-g-1,6-GPS:1-g-1,6-GPS:6-g-1,1-GPM in the isomalt composition is 1:(0.7-1.3):(0.3-1.1):(1-2), based on % w/w and dry matter (DM) of the glycosylated isomalt components.

The invention is based on the surprising finding that a solid isomalt composition containing the glycosylated isomalt components 6'-g-1,1-GPM (1-O-(6'-O-alpha-D-glucopyranosyl)-alpha-D-glucopyranosyl-D-mannitol), 6'-g-1,6-GPS (6-O-(6'-O-alpha-D-glucopyranosyl)-alpha-D-glucopyranosyl-D-sorbitol), 1-g-1,6-GPS (1,6-di-O-alpha-D-glucopyranosyl-D-sorbitol), and 6-g-1,1-GPM (1,6-di-O-alpha-D-glucopyranosyl-D-mannitol) in the specific weight ratio according to the invention shows improved pourability and/or flowability, particularly a reduced caking tendency. In the following, the four components 6'-g-1,1-GPM, 6'-g-1,6-GPS, 1-g-1,6-GPS, and 6-g-1,1-GPM are also referred to as "the glycosylated components."

The improved flowability and/or the improved pourability of the isomalt composition according to the invention is surprisingly retained over a long period of time, particularly when the solid isomalt composition is stored; in particular, little or no negative impact on the improved flowability and/or pourability is observed.

The improved flowability and/or the improved pourability advantageously allow for a more uniform pouring and portioning of the isomalt composition according to the invention. The isomalt composition according to the invention has a lower tendency to clump and to absorb water from the environment, particularly bind water to the surface of the particles of the solid isomalt composition.

In connection with the present invention, "flowability" refers to the property of a powder or of granular materials to form heaps on the basis of the internal friction, the surfaces of which form an angle to a base, on which they are placed. The flowability is preferably determined by the flow diameter according to European Pharmacopeia 8.0, Volume I, paragraph 2.9.36 (published on Jul. 15, 2013). The angle of repose of a pouring of the corresponding sample is examined. The sample (sample volume approximately 150 mL per measurement) is allowed to flow through a 10 mm funnel opening onto a base plate, wherein a conical heap is formed. A flank of the cone is then scanned with a laser beam and the angle of repose is determined. The flowability results from the angle of repose of the sample according to the classification contained in the European Pharmacopeia.

In connection with the present invention, the term "pourability" refers to the extent of the free mobility of powders or agglomerates. The pourability is determined, for example, using measuring funnels or pourability testing devices, wherein the pouring time is measured at a given mass or volume.

In connection with the present invention, the term "caking tendency" refers to an at least partial or complete solidification of an originally powdery material that occurs over the storage period. The solidification can be perceived visually by the formation of clumps. The caking tendency is preferably examined by applying an external pressure at constant temperature and relative humidity. The caking is classified as described in Example 5. For this purpose, the samples are filled twice in a cylindrical vessel (filling height ⅔ of the total height). The samples are each covered with sheets of film and weighted down with a stamp with a mass of 1.2 kg. There is a gap of approximately 1 mm between the sample vessel and the stamp, so that an air exchange with the surroundings is possible. The filled sample vessels are stored at 25° C. and 65% relative humidity for the respective periods (2, 4, 8, 12, 24 weeks). After storage, the stamps and the film are carefully removed without damaging the product surface. The samples are emptied from the sample vessels, wherein it is assessed whether the product pours out of the vessels completely and whether there are clumps in the resulting pouring. A classification was made as follows:

| 1 | No clumps present |
| 2 | Clumps <0.5 cm |

| 3 | Clumps >0.5 cm |
| 4 | Caking throughout the product |

In connection with the present invention, an isomalt composition according to the invention refers to a mixture which comprises 1,1-GPM (1-O-alpha-D-glucopyranosyl-D-mannitol), 1,6-GPS (6-O-alpha-D-glucopyranosyl-D-sorbitol) and the glycosylated isomalt components 6'-g-1,1-GPM, 6'-g-1,6-GPS, 1-g-1,6-GPS, and 6-g-1,1-GPM. In a preferred embodiment, the isomalt composition can also contain further components, such as 1,1-GPS (1-O-alpha-D-glucopyranosyl-D-sorbitol), deoxy disaccharide alcohols, glucosylglycitols, mannitol, sorbitol and/or further components occurring in small amounts.

In a preferred embodiment, the solid isomalt composition according to the invention has a weight ratio of 6'-g-1,1-GPM:6'-g-1,6-GPS:1-g-1,6-GPS:6-g-1,1-GPM of 1:(0.7-1.3):(0.3-1.1):(1.0-2.0), preferably of 1:(0.7-1.2):(0.5-1.0):(1.1-1.9), preferably of 1:(0.7-1.0):(0.6-1.0):(1.3-1.9), preferably of 1:(0.8-1.0):(0.7-1.0):(1,2-1,8), preferably of 1:(0.8-1.0):(0.8-1.0):(1.4-1.8), preferably of 1:(0.9-1.1):(0.9-1.1):(1.4-1.8), preferably of 1:(0.9-1.1):(1.1-1.4):(1.8-2.2), or preferably of 1:(0.9-1.1):(0.2-0.5):(1-1.2), each based on % w/w and dry matter (DM) of the glycosylated isomalt components.

In connection with the present invention, unless noted or recognizable otherwise, the percentages of individual components indicated for a composition of components add up to 100% w/w, i.e., the total composition.

In a particularly preferred embodiment, the solid isomalt composition according to the invention contains, in addition to the glycosylated isomalt components 1,6-GPS and 1,1-GPM, particularly a mixture of 1,6-GPS and 1,1-GPM in a ratio of 43 to 57% w/w of 1,6-GPS and 57 to 43% w/w of 1,1-GPM (each based on dry matter (DM) of the total amount of 1,6-GPS and 1,1-GPM). In a further preferred embodiment, the solid isomalt composition according to the invention contains a mixture of 1,6-GPS and 1,1-GPM in a 1,1-GPM-enriched form, particularly in a form in which more than 57, preferably 57.1, or preferably 57.2 to 99% w/w of 1,1-GPM and less than 43, preferably 42.9, or preferably 42.8 to 1% w/w of 1,6-GPS are present (each based on dry matter (DM) of the total amount of 1,6-GPS and 1,1-GPM). In a further preferred embodiment, the solid isomalt composition according to the invention contains a mixture of 1,6-GPS and 1,1-GPM in a 1,6-GPM-enriched form, particularly in a form in which more than 57, preferably 57.1, or preferably 57.2 to 99% w/w of 1,6-GPS and less than 43, preferably 42.9, or preferably 42.8 to 1% w/w of 1,1-GPM are present: in particular, the mixture contains 75 to 80% w/w of 1,6-GPS and 25 to 20% w/w of 1,1-GPM (each based on dry matter (DM) of the total amount of 1,6-GPS and 1,1-GPM).

In a preferred embodiment, the solid isomalt composition according to the invention contains at least 70% w/w of 1,6-GPS and 1,1-GPM, preferably at least 80% w/w, preferably at least 82% w/w, preferably at least 84% w/w, preferably at least 86% w/w, preferably at least 88% w/w, preferably at least 90% w/w, preferably at least 92% w/w, preferably at least 94% w/w, preferably at least 96% w/w, or preferably at least 98% w/w, each based on the total weight (DM) of the isomalt composition, wherein in a particularly preferred embodiment, this mixture contains 1,6-GPS and 1,1-GPM in the quantity ratios disclosed above.

In a preferred embodiment, the solid isomalt composition according to the invention contains at least 30% w/w of 1,6-GPS, preferably at least 35% w/w, preferably at least 40% w/w, preferably at least 45% w/w, preferably at least 50% w/w, preferably at least 55% w/w, preferably at least 60% w/w, preferably at least 65% w/w, preferably at least 70% w/w, preferably at least 75% w/w, preferably no more than 90% w/w, preferably no more than 80% w/w, preferably no more than 70% w/w, preferably no more than 60% w/w, preferably 40 to 90% w/w, preferably 50 to 90% w/w, preferably 60 to 90% w/w, preferably 30 to 80% w/w, preferably 40 to 80% w/w, or preferably 50 to 80% w/w, each based on the total weight (DM) of the isomalt composition.

In a preferred embodiment, the solid isomalt composition according to the invention contains at least 15% w/w of 1,1-GPM, preferably at least 20% w/w, preferably at least 25% w/w, preferably at least 30% w/w, preferably at least 35% w/w, preferably at least 40% w/w, preferably at least 45% w/w, preferably at least 50% w/w, preferably at least 55% w/w, preferably at least 60% w/w, preferably at least 65% w/w, preferably no more than 60% w/w, preferably no more than 50% w/w, preferably no more than 55% w/w, preferably no more than 45% w/w, preferably no more than 40% w/w, preferably no more than 35% w/w, preferably no more than 30% w/w, preferably no more than 25% w/w, preferably 10 to 60% w/w, preferably 20 to 60% w/w, preferably 20 to 50% w/w, preferably 20 to 40% w/w, preferably 10 to 50% w/w, preferably 10 to 40% w/w, or preferably 10 to 30% w/w, each based on the total weight (DM) of the isomalt composition.

In a preferred embodiment, the solid isomalt composition according to the invention contains the components 1,6-GPS, 1,1-GPM, 6'-g-1,1-GPM, 6'-g-1,6-GPS, 1-g-1,6-GPS, and 6-g-1,1-GPM and at least one further component selected from the group consisting of 1,1-GPS, deoxy disaccharide alcohols, GPI (glucopyranosyl-iditol), glycosylglycitols, mannitol, and sorbitol.

In a particularly preferred embodiment, the solid isomalt composition according to the invention contains 1,6-GPS, 1,1-GPM, 6'-g-1,1-GPM, 6'-g-1,6-GPS, 1-g-1,6-GPS, and 6-g-1,1-GPM as the only components.

In a preferred embodiment, the solid isomalt composition according to the invention contains 0.01 to 1% w/w of 6'-g-1,1-GPM, preferably 0.01 to 0.6% w/w, preferably 0.01 to 0.4% w/w, preferably 0.01 to 0.3% w/w, preferably 0.01 to 0.2% w/w, preferably 0.01 to 0.16% w/w, preferably 0, 01 to 0.14% w/w, preferably 0.01 to 0.12% w/w, preferably 0.01 to 0.1% w/w, preferably 0.01 to 0.08% w/w, preferably 0.03 to 1% w/w, preferably 0.03 to 0.6% w/w, preferably 0.03 to 0.4% w/w, preferably 0.03 to 0.3% w/w, preferably 0.03 to 0.2% w/w, or preferably 0.03 to 0.1% w/w, based on the total weight (DM) of the isomalt composition.

In a preferred embodiment, the solid isomalt composition according to the invention contains 0.01 to 1% w/w of 6'-g-1,6-GPS, preferably 0.01 to 0.6% w/w, preferably 0.01 to 0.4% w/w, preferably 0.01 to 0.3% w/w, preferably 0.01 to 0.2% w/w, preferably 0.01 to 0.16% w/w, preferably 0.01 to 0.14% w/w, preferably 0.01 to 0.12% w/w, preferably 0.01 to 0.1% w/w, preferably 0.01 to 0.08% w/w, preferably 0.03 to 1% w/w, preferably 0.03 to 0.6% w/w, preferably 0.03 to 0.4% w/w, preferably 0.03 to 0.3% w/w, preferably 0.03 to 0.2% w/w, or preferably 0.03 to 0.1% w/w, each based on the total weight (DM) of the isomalt composition.

In a preferred embodiment, the solid isomalt composition according to the invention contains 0.01 to 1% w/w of 1-g-1,6-GPS, preferably 0.01 to 0.6% w/w, preferably 0.01 to 0.4% w/w, preferably 0.01 to 0.3% w/w, preferably 0.01 to 0.2% w/w, preferably 0.01 to 0.16% w/w, preferably 0.01 to 0.14% w/w, preferably 0.01 to 0.12% w/w, preferably 0.01 to 0.1% w/w, preferably 0.01 to 0.08% w/w, preferably 0.03 to 1% w/w, preferably 0.03 to 0.6% w/w, preferably 0.03 to 0.4% w/w, preferably 0.03 to 0.3% w/w, preferably 0.03 to 0.2% w/w, or preferably 0.03 to 0.1% w/w, each based on the total weight (DM) of the isomalt composition.

In a preferred embodiment, the solid isomalt composition according to the invention contains 0.01 to 2% w/w of 6-g-1,1-GPM, preferably from 0.01 to 1.8% w/w, preferably from 0.02 to 1.6% w/w, preferably from 0.03 to 1.4% w/w, preferably 0.01 to 1.6% w/w, preferably 0.01 to 1.4% w/w, preferably 0.01 to 1.2% w/w, preferably 0.01 to 1% w/w, preferably 0.01 to 0.6% w/w, preferably 0.01 to 0.4% w/w, preferably 0.01 to 0.3% w/w, preferably 0.01 to 0.2% w/w, preferably 0.01 to 0.16% w/w, preferably 0.01 to 0.14% w/w, preferably 0.01 to 0.12% w/w, preferably 0.01 to 0.1% w/w, preferably 0.01 to 0.08% w/w, preferably 0.03 to 1% w/w, preferably 0.03 to 0.6% w/w, preferably 0.03 to 0.4% w/w, preferably 0.03 to 0.3% w/w, preferably 0.03 to 0.2% w/w, or preferably 0.03 to 0.1% w/w, each based on the total weight (DM) of the isomalt composition.

In a preferred embodiment, the solid isomalt composition according to the invention contains 97.5 to 99.5% w/w of 1,6-GPS and 1,1-GPM and 0.06 to 0.9% w/w of the glycosylated isomalt components 6'-g-1,1-GPM, 6'-g-1,6-GPS, 1-g-1,6-GPS, and 6-g-1,1-GPM, preferably 97.7 to 99.3% w/w of 1,6-GPS and 1,1-GPM and 0.08 to 0.8% w/w of the glycosylated isomalt components, or preferably 97.9 to 99.1% w/w of 1,6-GPS and 1,1-GPM and 0.1 to 0.7% w/w of the glycosylated isomalt components, each based on the total weight (DM) of the isomalt composition.

In a preferred embodiment, the solid isomalt composition according to the invention contains 97.5 to 99.5% w/w of 1,6-GPS and 1,1-GPM, 0.01 to 0.2% w/w of 6'-g-1,1-GPM, 0.01 to 0.2% w/w of 6'-g-1,6-GPS, 0.01 to 0.2% w/w of 1-g-1,6-GPS and 0.01 to 0.4% w/w of 6-g-1,1-GPM, preferably 97.7 to 99.3% w/w of 1,6-GPS and 1,1-GPM, 0.02 to 0.18% w/w of 6'-g-1,1-GPM, 0.02 to 0.18% w/w of 6'-g-1,6-GPS, 0.02 to 0.18% w/w of 1-g-1,6-GPS and 0.02 to 0.34% w/w of 6-g-1,1-GPM, or preferably 97.9 to 99.1% w/w of 1,6-GPS and 1,1-GPM, 0.03 to 1.6% w/w of 6'-g-1,1-GPM, 0.03 to 1.6% w/w of 6'-g-1,6-GPS, 0.03 to 1.6% w/w of 1-g-1,6-GPS and 0.04 to 0.28% w/w of 6-g-1,1-GPM, each based on the total weight (DM) of the isomalt composition.

In a preferred embodiment, the solid isomalt composition according to the invention contains 40 to 89% w/w of 1,6-GPS, 10 to 59% w/w of 1,1-GPM and 0.06 to 0.9% w/w of the glycosylated isomalt components 6'-g-1,1-GPM, 6'-g-1,6-GPS, 1-g-1,6-GPS, and 6-g-1,1-GPM, preferably 40 to 79% w/w of 1,6-GPS, 20 to 59% w/w of 1,1-GPM and 0.08 to 0.8% w/w of the glycosylated isomalt components, or preferably 50 to 79% w/w of 1,6-GPS, 20 to 49% w/w of 1,1-GPM and 0.1 to 0.7% w/w of the glycosylated isomalt components, each based on the total weight (DM) of the isomalt composition.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and 1,1-GPS (1-O-alpha-D-glucopyranosyl-D-sorbitol).

In a preferred embodiment, the solid isomalt composition according to the invention contains 0.1 to 10% w/w of 1,1-GPS, preferably 0.1 to 8% w/w, preferably 0.1 to 6% w/w, preferably 0.1 to 5% w/w, preferably 0.1 to 4% w/w, preferably 0.1 to 3% w/w, preferably 0.1 to 2% w/w, preferably 0.1 to 1% w/w, preferably 0.1 to 0.8% w/w, preferably 0.1 to 0.6% w/w, preferably 0.1 to 0.4% w/w, preferably 0.2 to 10% w/w, preferably 0.2 to 8% w/w, preferably 0.2 to 6% w/w, preferably 0.2 to 5% w/w, preferably 0.2 to 4% w/w, preferably 0.2 to 3% w/w, preferably 0.2 to 2% w/w, preferably 0.2 to 1% w/w, preferably 0.2 to 0.8% w/w, preferably 0.2 to 0.6% w/w, preferably 0.2 to 0.4% w/w, 0.5 to 10% w/w, preferably 0.5 to 8% w/w, preferably 0.5 to 6% w/w, preferably 0.5 to 5% w/w, preferably 0.5 to 4% w/w, preferably 0.5 to 3% w/w, preferably 0.5 to 2% w/w, preferably 0.5 up to 1% w/w, preferably 0.5 to 0.8% w/w, 1 to 10% w/w, preferably 1 to 8% w/w, preferably 1 to 6% w/w, preferably 1 to 5% w/w, preferably 1 to 4% w/w, preferably 1 to 3% w/w, or preferably 1 to 2% w/w, each based on the total weight (DM) of the isomalt composition.

In a particularly preferred embodiment, the solid isomalt composition according to the invention does not contain 1,1-GPS.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and deoxy disaccharide alcohols.

In a preferred embodiment, the solid isomalt composition according to the invention contains 0.01 to 2% w/w of deoxy disaccharide alcohols, preferably 0.01 to 1% w/w, preferably 0.01 to 0.8% w/w, preferably 0.01 to 0.6% w/w, preferably 0.01 to 0.4% w/w, preferably 0.01 to 0.2% w/w, preferably 0.01 to 0.5% w/w, preferably 0.01 to 0.1% w/w, 0.03 to 1.0% w/w, preferably 0.03 to 0.8% w/w, preferably 0.03 to 0.6% w/w, preferably 0.03 to 0.4% w/w, preferably 0.03 to 0.2% w/w, preferably 0.03 to 0.5% w/w, preferably 0.03 to 0.1% w/w, preferably 0.1 to 1% w/w, preferably 0.1 to 2% w/w, preferably 0.1 to 4% w/w, preferably 0.1 to 8% w/w, preferably 0.2 to 2% w/w, preferably 0.4 to 1% w/w, or preferably 0.4 to 2% w/w, each based on the total weight (DM) of the isomalt composition.

In a particularly preferred embodiment, the solid isomalt composition according to the invention contains no deoxy disaccharide alcohols.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and glycosylglycitols.

In a preferred embodiment, the solid isomalt composition according to the invention contains 0.01 to 2% w/w glycosylglycitols, preferably 0.01 to 1% w/w, preferably 0.01 to 0.8% w/w, preferably 0.01 to 0.6% w/w, preferably 0.01 to 0.5% w/w, preferably 0.01 to 0.4% w/w, preferably 0.01 to 0.2% w/w, preferably 0.01 to 0.1% w/w, 0.03 to 1.0% w/w, preferably 0.03 to 2.0% w/w, preferably 0.03 to 0.8% w/w, preferably 0.03 to 0.6% w/w, preferably 0.03 to 0.5% w/w, preferably 0.03 to 0.4% w/w, preferably 0.03 to 0.2% w/w, preferably 0.03 to 0.1% w/w, 0.04 to 1.0% w/w, preferably 0.04 to 2.0% w/w, preferably 0.04 to 0.8% w/w, preferably 0.04 to 0.6% w/w, preferably 0.04 to 0.5% w/w, preferably 0.04 to 0.4% w/w, preferably 0.04 to 0.2% w/w, preferably 0.04 to 0.1% w/w, preferably 0.1 to 0.4% w/w, preferably 0.1 to 0.6% w/w, preferably 0.1 to 0.8% w/w, preferably 0.1 to 1% w/w, preferably 0.1 to 2% w/w, preferably 0.1 to 4% w/w, preferably 0.1 to 8% w/w, preferably 0.2 to 2% w/w, preferably 0.4 to 2% w/w, or preferably 0.4 to 1% w/w, each based on the total weight (DM) of the isomalt composition.

In a particularly preferred embodiment, the solid isomalt composition according to the invention contains no glycosylglycitols.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and mannitol.

In a preferred embodiment, the solid isomalt composition according to the invention contains 0.01 to 0.3% w/w of mannitol, preferably 0.01 to 0.2% w/w, preferably 0.01 to 0.16% w/w, preferably 0.01 to 0.12% w/w, preferably 0.01 to 0.1% w/w, preferably 0.01 to 0.08% w/w, preferably 0.01 to 0.06% w/w, preferably 0.01 to 0.04% w/w, preferably 0.02 to 0.3% w/w, preferably 0.02 to 0.2% w/w, preferably 0.02 to 0.16% w/w, preferably 0.02 to 0.1% w/w, preferably 0.02 to 0.06% w/w, preferably 0.04 to 0.16% w/w, preferably 0.04 to 0.2% w/w, preferably 0.04 to 0.1% w/w, preferably 0.04 to 0.08% w/w, preferably 0.06 to 0.2% w/w, preferably 0.06 to 0.14% w/w, preferably 0.06 to 0.1% w/w, or preferably 0.06 to 0.08% w/w, each based on the total weight (DM) of the isomalt composition.

In a particularly preferred embodiment, the solid isomalt composition according to the invention contains no mannitol.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and sorbitol.

In a preferred embodiment, the solid isomalt composition according to the invention contains 0.01 to 0.4% w/w of sorbitol, preferably 0.01 to 0.3% w/w, preferably 0.01 to 0.24% w/w, preferably 0.01 to 0.2% w/w, preferably 0.01 to 0.1% w/w, preferably 0.01 to 0.06% w/w, preferably 0.02 to 0.3% w/w, preferably 0.02 to 0.2% w/w, preferably 0.02 to 0.1% w/w, preferably 0.02 to 0.06% w/w, preferably 0.04 to 0.3% w/w, preferably 0.04 to 0.24% w/w, preferably 0.04 to 0.2% w/w, preferably 0.04 to 0.1% w/w, preferably 0.04 to 0.08% w/w, preferably 0.06 to 0.24% w/w, preferably 0.06 to 0.2% w/w, preferably 0.06 to 0.14% w/w, preferably 0.06 to 0.1% w/w, or preferably 0.06 to 0.08% w/w, each based on the total weight (DM) of the isomalt composition.

In a particularly preferred embodiment, the solid isomalt composition according to the invention contains no sorbitol.

In a preferred embodiment, the solid isomalt composition according to the invention contains 1,6-GPS, 1,1-GPM, 6'-g-1,1-GPM, 6'-g-1,6-GPS, 1-g-1,6-GPS, 6-g-1,1-GPM, and GPI.

In a preferred embodiment, the solid isomalt composition according to the invention contains 0.01 to 0.2% w/w of GPI, preferably 0.01 to 0.16% w/w, preferably 0.01 to 0.12% w/w, preferably 0.01 to 0.1% w/w, preferably 0.01 to 0.08% w/w, preferably 0.01 to 0.06% w/w, preferably 0.01 to 0.04% w/w, preferably 0.02 to 0.3% w/w, preferably 0.02 to 0.2% w/w, preferably 0.02 to 0.16% w/w, preferably 0.02 to 0.1% w/w, preferably 0.02 to 0.06% w/w, preferably 0.04 to 0.16% w/w, preferably 0.04 to 0.2% w/w, preferably 0.04 to 0.1% w/w, preferably 0.04 to 0.08% w/w, preferably 0.06 to 0.2% w/w, preferably 0.06 to 0.14% w/w, or preferably 0.06 to 0.1% % w/w, each based on the total weight (DM) of the isomalt composition.

In a particularly preferred embodiment, the solid isomalt composition according to the invention contains no GPI.

In a preferred embodiment, the solid isomalt composition according to the invention contains no more than 10% w/w of water, preferably no more than 8% w/w, preferably no more than 6% w/w, preferably no more than 4% w/w, preferably no more than 2% w/w, preferably 2 to 10% w/w, preferably 2 to 8% w/w, preferably 2 to 6% w/w, preferably 2 to 4% w/w, preferably 1 to 8% w/w, preferably 1 to 6% w/w, preferably 1 to 4% w/w, or preferably 1 to 2% w/w, each based on the total weight of the isomalt composition. In a particularly preferred embodiment, the solid isomalt composition according to the invention is anhydrous.

In a preferred embodiment, the solid isomalt composition according to the invention is present in crystalline form. In a further preferred embodiment, the solid isomalt composition according to the invention is present in semicrystalline or amorphous form.

In a preferred embodiment, the solid isomalt composition is present in particulate form. In a preferred embodiment, the solid isomalt composition according to the invention has a particle size distribution according to which at least 90% of the particles have a size of no more than 1000 μm, preferably no more than 800 μm, preferably no more than 600 μm, preferably no more than 500 μm, preferably no more than 400 μm, preferably no more than 300 μm, preferably no more than 200 μm, preferably no more than 100 μm, preferably no more than 80 μm, or preferably no more than 60 μm. In a preferred embodiment, the solid isomalt composition according to the invention has a particle size distribution according to which at least 90% of the particles have a particle size of 100 to 1000 μm, preferably 100 to 800 μm, preferably 100 to 500 μm, preferably 200 to 800 μm, preferably 300 to 600 μm, preferably 10 to 90 μm, preferably 20 to 80 μm, preferably 30 to 80 μm, preferably 40 to 80 μm, preferably 50 to 80 μm, preferably 50 to 100 μm, preferably 50 to 200 μm, preferably 10 to 50 μm, preferably 10 to 60 μm, preferably 20 to 50 μm, preferably 20 to 60 μm, preferably 1 to 200 μm, or preferably 1 to 100 μm.

In a particularly preferred embodiment, the solid isomalt composition according to the invention has a particle size distribution according to which at least 90%, particularly 90%, of the particles have a particle size of no more than 100 μm, particularly <100 μm. In a particularly preferred embodiment, the solid isomalt composition according to the invention has a particle size distribution according to which at least 90%, particularly 90%, of the particles have a particle size of 200 to 710 μm. In a further particularly preferred embodiment, the solid isomalt composition according to the invention has a particle size distribution according to which at least 90%, particularly 90%, of the particles have a size of 500 to 3500 μm.

In a preferred embodiment, the solid isomalt composition according to the invention has at least one sweetness enhancer.

In connection with the present invention, a sweetness enhancer refers to a substance which, in contrast to intensive sweeteners, has no or hardly any sweet taste, i.e., no or only very little intrinsic sweetness, but which can enhance the sweetness of another sweet substance.

The present invention also provides the use of the isomalt composition according to the invention in products for human and/or animal consumption; the product for human and/or animal consumption is preferably a food or luxury food product or a pharmaceutical product.

In a preferred embodiment, the food or luxury food product is a confectionery, a filling for confectionery, a soft caramel, a hard caramel, a fondant, a yoghurt, a pastry, a chewing gum, an ice cream, milk, a milk product, a drink, a fruit juice, a fruit juice concentrate, a fruit preparation, a jam, a jelly, or a smoothie.

In a preferred embodiment, the food or luxury food product has at least 1, 2, 3, 4, 5, 6, 7, 8, 9, 10, 20, 30, 40, 50, 60, 70, 80, 90, 95, 98, particularly 99% w/w of the solid isomalt composition according to the invention, based on the total weight (DM) of the food or luxury food product.

The solid isomalt compositions according to the invention can be produced, for example, by isolating particularly the glycosylated isomalt components individually from conventional, generally known isomalt compositions using chromatographic methods as described, for example, in EP 0 625 578 A1. With regard to the description of the production of an isomalt composition, referred to therein as a sweetener, and its composition, said document is fully incorporated into the disclosure of the present invention.

In a preferred embodiment, the isolated, separately present glycosylated isomalt components (6'-g-1,1-GPM, 6'-g-1,6-GPS, 1-g-1,6-GPS, and 6-g-1,1-GPM) for producing the solid isomalt compositions according to the invention in the weight ratios and amounts of their individual components provided according to the invention can be mixed with one another and with further components, particularly 1,1-GPM, 1,6-GPS and optionally 1,1-GPS.

Further advantageous embodiments of the invention are described in the dependent claims.

The invention shall be explained in more detail using embodiments.

EXAMPLE 1

Production of Crystalline Isomalt Compositions According to the Invention (Unsieved)

Both isomalt compositions according to the invention and comparative isomalt compositions were produced which have 1,6-GPS and 1,1-GPM in an equimolar ratio of 43 to 57% w/w of 1,6-GPS to 57 to 43% w/w of 1,1-GPM and in the following are called isomalt ST-based compositions (isomalt ST-base) (see Table 1). In addition, isomalt compositions according to the invention and comparative isomalt compositions were produced which have 1,6-GPS and 1,1-GPM in a ratio of 70 to 80% w/w of 1,6-GPS to 30 to 20% w/w of 1,1-GPM and are called isomalt GS-based compositions (isomalt GS-base) (see Table 1).

For producing the isomalt-based compositions mentioned, an isomalt composition (sweetener) was produced according to Example 1 of EP 0 625 578 A1, which in said document was called a hydrogenated isomerized sucrose, and subjected to a chromatographic separation of the components 1,1-GPM, 1,6-GPS, 1,1-GPS, 6'-g-1,1-GPM, 6'-g-1,6-GPS, 1-g-1,6-GPS, 6-g-1,1-GPM, deoxy-disaccharide alcohol fraction, and glycosylglycitol fraction contained in this composition. The individual components obtained after the separation in isolated form were mixed with commercially available mannitol and sorbitol in the amounts and quantity ratios shown in Table 1 below, and essentially crystalline mixtures were thus obtained.

The composition of the obtained crystalline isomalt compositions according to the invention (samples 17 to 32) and of comparative isomalt compositions (samples 1 to 16), in each case unsieved, are listed in Table 1, specifying the amounts of 6'-g-1,1-GPM, 6'-g-1,6-GPS, 1-g-1,6-GPS, 6-g-1,1-GPM, 1,1-GPM, 1,6-GPS, 1,1-GPS, mannitol, sorbitol, deoxy disaccharide alcohols, and glycosylglycitols.

Sample 3 (comparative isomalt composition) can also be obtained by applying the method conditions mentioned in Example 1 of EP 0 625 578 A1 to an isomerized sucrose solution and subsequent chromatographic purification.

Both the comparative isomalt compositions and the isomalt compositions according to the invention have identical components and are characterized particularly by the presence of the four glycosylated components. When compared to the comparative isomalt compositions, the isomalt compositions according to the invention are characterized particularly by different quantity ratios of the four glycosylated components to one another.

TABLE 1

|  | Sample number | 6'-G-1.1 GPM g/100 g DM | 6'-G-1.6 GPS g/100 g DM | 1-G-1.6 GPS g/100 g DM | 6-G-1.1 GPM g/100 g DM | Ratio | 1,1-GPM g/100 g DM | 1,6-GPS g/100 g DM |
|---|---|---|---|---|---|---|---|---|
|  |  | | | GC analysis | | | | GC analysis |
|  | Isomalt ST-base | | | | | | | |
| Comparison | 1 | 0.06 | 0.03 | 0.01 | 0.05 | 1:0.5:0.2:0.8 | 47.8 | 50.8 |
|  | 2 | 0.02 | 0.03 | 0.05 | 0.08 | 1:1.5:2.5:4.0 | 48.9 | 50.3 |
|  | 3 | 0.02 | 0.02 | 0.04 | 0.06 | 1:1.0:2.0:3.0 | 48.3 | 50.5 |
|  | 4 | 0.06 | 0.11 | 0.12 | 0.19 | 1:1.8:2.0:3.2 | 47.8 | 51.1 |
|  | 5 | 0.12 | 0.13 | 0.19 | 0.2 | 1:1.1:1.6:1.7 | 48.1 | 50.5 |
|  | 6 | 0.05 | 0.03 | 0.04 | 0.12 | 1:0.6:0.8:2.4 | 47.7 | 50.6 |
|  | 7 | 0.14 | 0.18 | 0.23 | 0.09 | 1:1.3:1.6:0.6 | 47.2 | 51.4 |
|  | 8 | 0.04 | 0.06 | 0.05 | 0.09 | 1:1.5:1.3:2.3 | 44.8 | 53.7 |
|  | Isomalt GS-base | | | | | | | |
|  | 9 | 0.07 | 0.04 | 0.01 | 0.06 | 1:0.6:0.1:0.9 | 23.6 | 75.1 |
|  | 10 | 0.03 | 0.05 | 0.1 | 0.11 | 1:1.7:3.3:3.7 | 22.4 | 76.2 |
|  | 11 | 0.04 | 0.05 | 0.12 | 0.13 | 1:1.3:3.0:3.3 | 22.4 | 76.2 |
|  | 12 | 0.09 | 0.13 | 0.13 | 0.24 | 1:1.4:1.4:2.7 | 22.6 | 76 |
|  | 13 | 0.16 | 0.14 | 0.21 | 0.28 | 1:0.9:1.3:1.8 | 23 | 75.2 |
|  | 14 | 0.05 | 0.06 | 0.08 | 0.09 | 1:1.2:1.6:1.8 | 22.9 | 75.5 |
|  | 15 | 0.04 | 0.06 | 0.04 | 0.11 | 1:1.5:1.0:2.8 | 22.6 | 75.9 |
|  | 16 | 0.09 | 0.13 | 0.11 | 0.19 | 1:1.4:1.2:2.1 | 22.5 | 76.2 |
|  | Isomalt ST-base | | | | | 1 (0.7-1.3) (0.3-1.1) (1-2) | | |
| Invention | 17 | 0.07 | 0.05 | 0.02 | 0.07 | 1:0.7:0.3:1.0 | 47 | 50.7 |
|  | 18 | 0.02 | 0.02 | 0.01 | 0.03 | 1:1.0:0.5:1.5 | 47.3 | 51.9 |
|  | 19 | 0.08 | 0.1 | 0.08 | 0.15 | 1:1.3:1.0:1.9 | 48.3 | 50.5 |
|  | 20 | 0.18 | 0.13 | 0.16 | 0.26 | 1:0.7:0.9:1.4 | 49.9 | 48 |

TABLE 1-continued

| | | | | | | | |
|---|---|---|---|---|---|---|---|
| | 21 | 0.02 | 0.02 | 0.02 | 0.03 | 1:1.0:1.0:1.5 | 47.8 | 51.1 |
| | 22 | 0.07 | 0.07 | 0.06 | 0.08 | 1:1.0:0.9:1.1 | 47.5 | 50.9 |
| | 23 | 0.06 | 0.07 | 0.06 | 0.11 | 1:1.2:1.0:1.8 | 48.7 | 50.2 |
| | 24 | 0.11 | 0.14 | 0.12 | 0.22 | 1:1.3:1.1:2.0 | 48.1 | 50.6 |
| Isomalt GS-base | | | | | | | | |
| | 25 | 0.09 | 0.06 | 0.03 | 0.09 | 1:0.7:0.3:1.0 | 21 | 77.1 |
| | 26 | 0.05 | 0.04 | 0.04 | 0.08 | 1:0.8:0.8:1.6 | 22.7 | 76 |
| | 27 | 0.13 | 0.12 | 0.13 | 0.21 | 1:0.9:1.0:1.6 | 22.7 | 75.8 |
| | 28 | 0.15 | 0.15 | 0.11 | 0.18 | 1:1.0:0.7:1.2 | 22.1 | 76.1 |
| | 29 | 0.03 | 0.03 | 0.04 | 0.06 | 1:1.0:1.3:2.0 | 20.6 | 78 |
| | 30 | 0.06 | 0.07 | 0.05 | 0.08 | 1:1.2:0.8:1.3 | 22.3 | 76.5 |
| | 31 | 0.03 | 0.04 | 0.02 | 0.05 | 1:1.3:0.7:1.7 | 22.4 | 75.9 |
| | 32 | 0.08 | 0.1 | 0.09 | 0.16 | 1:1.3:1.1:2.0 | 22.1 | 76.1 |

| | Sample number | 1,1-GPS g/100 g DM | Mannitol g/100 g DM | Sorbitol g/100 g DM | Deoxy disaccharide alcohols g/100 g DM | Glucosyl glycitols g/100 g DM | Total 1,1-GPM + 1,6-GPS g/100 g DM |
|---|---|---|---|---|---|---|---|
| | | | | | GC analysis | | |
| | Isomalt ST-base | | | | | | |
| Comparison | 1 | 0.31 | 0.05 | 0.15 | 0.3 | 0.25 | 98.6 |
| | 2 | 0.27 | 0.05 | 0.09 | 0.07 | 0.12 | 99.2 |
| | 3 | 0.25 | 0.04 | 0.08 | 0.09 | 0.02 | 98.8 |
| | 4 | 0.27 | 0.08 | 0.12 | 0.1 | 0.04 | 98.9 |
| | 5 | 0.28 | 0.03 | 0.07 | 0.09 | 0.03 | 98.6 |
| | 6 | 0.36 | 0.04 | 0.09 | 0.14 | 0.24 | 98.3 |
| | 7 | 0.23 | 0.04 | 0.13 | 0.08 | 0.03 | 98.6 |
| | 8 | 0.24 | 0.03 | 0.09 | 0.07 | 0.02 | 98.5 |
| Isomalt GS-base | | | | | | | |
| | 9 | 0.46 | 0.05 | 0.16 | 0.17 | 0.2 | 98.7 |
| | 10 | 0.43 | 0.04 | 0.11 | 0.1 | 0.24 | 98.6 |
| | 11 | 0.37 | 0.06 | 0.18 | 0.07 | 0.03 | 98.6 |
| | 12 | 0.41 | 0.07 | 0.17 | 0.09 | 0.01 | 98.6 |
| | 13 | 0.55 | 0.05 | 0.13 | 0.14 | 0.05 | 98.2 |
| | 14 | 0.57 | 0.05 | 0.15 | 0.12 | 0.09 | 98.4 |
| | 15 | 0.4 | 0.04 | 0.13 | 0.1 | 0.04 | 98.5 |
| | 16 | 0.35 | 0.04 | 0.12 | 0.12 | 0.08 | 98.7 |
| Isomalt ST-base | | | | | | | |
| Invention | 17 | 0.3 | 0.05 | 0.1 | 0.1 | 0.38 | 97.7 |
| | 18 | 0.29 | 0.04 | 0.1 | 0.1 | 0.13 | 99.2 |
| | 19 | 0.21 | 0.03 | 0.08 | 0.08 | 0.14 | 98.8 |
| | 20 | 0.22 | 0.05 | 0.13 | 0.09 | 0.33 | 97.9 |
| | 21 | 0.33 | 0.05 | 0.11 | 0.13 | 0.27 | 98.9 |
| | 22 | 0.36 | 0.07 | 0.17 | 0.21 | 0.2 | 98.4 |
| | 23 | 0.24 | 0.03 | 0.06 | 0.05 | 0.14 | 98.9 |
| | 24 | 0.22 | 0.07 | 0.13 | 0.12 | 0.06 | 98.7 |
| Isomalt GS-base | | | | | | | |
| | 25 | 0.38 | 0.04 | 0.12 | 0.08 | 0.1 | 98.1 |
| | 26 | 0.49 | 0.07 | 0.2 | 0.09 | 0.12 | 98.7 |
| | 27 | 0.44 | 0.05 | 0.17 | 0.12 | 0.09 | 98.5 |
| | 28 | 0.46 | 0.09 | 0.22 | 0.16 | 0.26 | 98.2 |
| | 29 | 0.37 | 0.05 | 0.16 | 0.11 | 0.08 | 98.6 |
| | 30 | 0.38 | 0.04 | 0.14 | 0.13 | 0.11 | 98.8 |
| | 31 | 0.41 | 0.08 | 0.3 | 0.23 | 0.24 | 98.3 |
| | 32 | 0.47 | 0.06 | 0.15 | 0.12 | 0.18 | 98.2 |

EXAMPLE 2

Production of Crystalline Products According to the Invention with a Defined Particle Size Distribution Compositions with a defined particle size distribution were obtained from the isomalt compositions according to the invention (samples 17 to 32) and comparative compositions from isomalt (samples 1 to 16). The crystalline products with a defined particle size distribution (sieved) are shown in Table 2.

TABLE 2

|  |  | Particle size distribution | | |
| --- | --- | --- | --- | --- |
|  |  | 90% from 0.5 to 3.5 mm | 90% from 0.2 to 0.71 mm | 90% <0.1 mm |
|  |  |  | Method |  |
|  | Starting material | ICUMSA GS2/9-37 | ICUMSA GS2/9-37 | Ground, air jet sieving |
|  |  | Sample number | | |
|  | *Isomalt ST-base* | | | |
| Comparison | 1 | 1a | 1b | 1c |
|  | 2 | 2a | 2b | 2c |
|  | 3 | 3a | 3b | 3c |
|  | 4 | 4a | 4b | 4c |
|  | 5 | 5a | 5b | 5c |
|  | 6 | 6a | 6b | 6c |
|  | 7 | 7a | 7b | 7c |
|  | 8 | 8a | 8b | 8c |
|  | *Isomalt GS-base* | | | |
|  | 9 | 9a | 9b | 9c |
|  | 10 | 10a | 10b | 10c |
|  | 11 | 11a | 11b | 11c |
|  | 12 | 12a | 12b | 12c |
|  | 13 | 13a | 13b | 13c |
|  | 14 | 14a | 14b | 14c |
|  | 15 | 15a | 15b | 15c |
|  | 16 | 16a | 16b | 16c |
|  | *Isomalt ST-base* | | | |
| Invention | 17 | 17a | 17b | 17c |
|  | 18 | 18a | 18b | 18c |
|  | 19 | 19a | 19b | 19c |
|  | 20 | 20a | 20b | 20c |
|  | 21 | 21a | 21b | 21c |
|  | 22 | 22a | 22b | 22c |
|  | 23 | 23a | 23b | 23c |
|  | 24 | 24a | 24b | 24c |
|  | *Isomalt GS-base* | | | |
|  | 25 | 25a | 25b | 25c |
|  | 26 | 26a | 26b | 26c |
|  | 27 | 27a | 27b | 27c |
|  | 28 | 28a | 28b | 28c |
|  | 29 | 29a | 29b | 29c |
|  | 30 | 30a | 30b | 30c |
|  | 31 | 31a | 31b | 31c |
|  | 32 | 32a | 32b | 32c |

In the following (Examples 3 to 5), the isomalt compositions according to the invention and the comparative isomalt compositions with a particle size of 0.5 to 3.5 mm are identified as sample series a, the isomalt compositions according to the invention and the comparative isomalt compositions with a particle size distribution of 90% from 0.2 to 0.71 mm are identified as sample series b, and the isomalt compositions according to the invention and the comparative isomalt compositions with a particle size distribution of 90%<0.1 mm are identified as sample series c.

EXAMPLE 3

Examination of the Flowability (Sample Series a and b)

The flowability was examined according to European Pharmacopeia 8.0, Volume I, paragraph 2.9.36 (powder flow) (published on Jul. 15, 2013) and classified as follows. The angle of repose of a pouring of the corresponding sample was examined using a GTB powder and granulate flow tester from ERWEKA. The sample (sample volume approximately 150 mL per measurement) was allowed to flow through a 10 mm funnel opening onto the base plates, wherein a conical heap was formed. A flank of the cone was then scanned with a laser beam and the angle of repose was determined. The flow properties of the sample resulted from the angle of repose according to the classification contained in the European Pharmacopeia. The results (Table 3) are each averaged from three individual measurements.

The flowability of the isomalt compositions according to the invention (samples 17 to 32) was good for all samples of the sample series a and b, while the flowability ("flow property") of the comparative compositions of isomalt (samples 1 to 16) was, surprisingly, significantly worse. Surprisingly, particularly the quantity ratio of the four glycosylated components to one another has a significant influence on facilitating the flowability of isomalt compositions.

A classification was made as follows:

| Flowability | Angle of repose ° |
|---|---|
| excellent | 25 . . . 30 |
| good | 31 . . . 35 |
| satisfactory (no help needed) | 36 . . . 40 |
| sufficient (possible halting) | 41 . . . 45 |
| insufficient (shaking required) | 46 . . . 55 |
| very bad | 56 . . . 65 |
| extremely bad | >66 |

TABLE 3

| | | Sample number | Flowability European Pharmacopeia, Chapter 2.9.36, Powder Flow Flow property |
|---|---|---|---|
| | Isomalt ST-base | | |
| Comparison | | 1a | Satisfactory |
| | | 2a | Satisfactory |
| | | 3a | Sufficient |
| | | 4a | Satisfactory |
| | | 5a | Satisfactory |
| | | 6a | Sufficient |
| | | 7a | Sufficient |
| | | 8a | Satisfactory |
| | Isomalt GS-base | | |
| | | 9a | Sufficient |
| | | 10a | Satisfactory |
| | | 11a | Sufficient |
| | | 12a | Satisfactory |
| | | 13a | Satisfactory |
| | | 14a | Sufficient |
| | | 15a | Sufficient |
| | | 16a | Satisfactory |
| | Isomalt ST-base | | |
| Comparison | | 1b | Satisfactory |
| | | 2b | Sufficient |
| | | 3b | Satisfactory |
| | | 4b | Sufficient |
| | | 5b | Sufficient |
| | | 6b | Satisfactory |
| | | 7b | Satisfactory |
| | | 8b | Sufficient |
| | Isomalt GS-base | | |
| | | 9b | Sufficient |
| | | 10b | Satisfactory |
| | | 11b | Satisfactory |
| | | 12b | Sufficient |
| | | 13b | Satisfactory |
| | | 14b | Sufficient |
| | | 15b | Sufficient |
| | | 16b | Satisfactory |
| | Isomalt ST-base | | |
| Invention | | 17a | Good |
| | | 18a | Good |
| | | 19a | Good |
| | | 20a | Good |
| | | 21a | Good |
| | | 22a | Good |
| | | 23a | Good |
| | | 24a | Good |
| | Isomalt GS-base | | |
| | | 25a | Good |
| | | 26a | Good |
| | | 27a | Good |
| | | 28a | Good |
| | | 29a | Good |
| | | 30a | Good |
| | | 31a | Good |
| | | 32a | Good |
| | Isomalt ST-base | | |
| Invention | | 17b | Good |
| | | 18b | Good |
| | | 19b | Good |
| | | 20b | Good |
| | | 21b | Good |
| | | 22b | Good |
| | | 23b | Good |
| | | 24b | Good |
| | Isomalt GS-base | | |
| | | 25b | Good |
| | | 26b | Good |
| | | 27b | Good |
| | | 28b | Good |
| | | 29b | Good |
| | | 30b | Good |
| | | 31b | Good |
| | | 32b | Good |

EXAMPLE 4

Flowability After Storage (Sample Series a and b)

The samples of series a and b were additionally stored at 25° C., 65% rel. humidity, for a total of 24 weeks, and the flowability was determined after 0, 2, 4, 8, 12, and 24 weeks. For the isomalt compositions according to the invention (samples 17 to 32), a significantly smaller negative impact on the excellent flowability was observed over the storage time when compared to the comparative compositions of isomalt (samples 1 to 16) (see tables 4 and 5).

TABLE 4

Flowability - Storage test (a-series)
Conditions:
Temperature: 25° C.
rel. humidity: 65%

| | Sample number | Flowability Weeks |  |  |  |  |  |
|---|---|---|---|---|---|---|---|
| | | 0 | 2 | 4 | 8 | 12 | 24 |
| | | European Pharmacopeia, Chapter 2.9.36, Powder Flow Flow property | | | | | |
| | | *Isomalt ST-base* | | | | | |
| Comparison | 1a | Satisfactory | Satisfactory | Sufficient | Sufficient | Insufficient | Insufficient |
| | 2a | Satisfactory | Satisfactory | Satisfactory | Sufficient | Sufficient | Insufficient |
| | 3a | Sufficient | Sufficient | Sufficient | Sufficient | Insufficient | Insufficient |
| | 4a | Satisfactory | Satisfactory | Sufficient | Sufficient | Insufficient | Insufficient |
| | 5a | Satisfactory | Satisfactory | Sufficient | Sufficient | Sufficient | Insufficient |
| | 6a | Sufficient | Sufficient | Sufficient | Sufficient | Insufficient | Insufficient |
| | 7a | Sufficient | Sufficient | Sufficient | Insufficient | Insufficient | Insufficient |
| | 8a | Satisfactory | Satisfactory | Sufficient | Sufficient | Sufficient | Insufficient |
| | | *Isomalt GS-base* | | | | | |
| | 9a | Sufficient | Sufficient | Sufficient | Sufficient | Insufficient | Insufficient |
| | 10a | Satisfactory | Satisfactory | Sufficient | Sufficient | Insufficient | Insufficient |
| | 11a | Sufficient | Sufficient | Sufficient | Insufficient | Insufficient | Insufficient |
| | 12a | Satisfactory | Sufficient | Sufficient | Sufficient | Sufficient | Insufficient |
| | 13a | Satisfactory | Sufficient | Sufficient | Sufficient | Insufficient | Insufficient |
| | 14a | Sufficient | Sufficient | Sufficient | Insufficient | Insufficient | Insufficient |
| | 15a | Sufficient | Sufficient | Sufficient | Insufficient | Insufficient | Insufficient |
| | 16a | Satisfactory | Satisfactory | Sufficient | Sufficient | Sufficient | Insufficient |
| | | *Isomalt ST-base* | | | | | |
| Invention | 17a | Good | Good | Good | Satisfactory | Satisfactory | Satisfactory |
| | 18a | Good | Good | Satisfactory | Satisfactory | Sufficient | Sufficient |
| | 19a | Good | Good | Good | Satisfactory | Satisfactory | Sufficient |
| | 20a | Good | Good | Good | Satisfactory | Satisfactory | Sufficient |
| | 21a | Good | Good | Good | Satisfactory | Satisfactory | Sufficient |
| | 22a | Good | Good | Satisfactory | Satisfactory | Sufficient | Sufficient |
| | 23a | Good | Good | Good | Satisfactory | Satisfactory | Satisfactory |
| | 24a | Good | Good | Satisfactory | Satisfactory | Satisfactory | Sufficient |
| | | *Isomalt GS-base* | | | | | |
| | 25a | Good | Good | Good | Satisfactory | Satisfactory | Satisfactory |
| | 26a | Good | Good | Satisfactory | Satisfactory | Satisfactory | Sufficient |
| | 27a | Good | Good | Good | Satisfactory | Satisfactory | Sufficient |
| | 28a | Good | Good | Good | Satisfactory | Satisfactory | Satisfactory |
| | 29a | Good | Good | Satisfactory | Satisfactory | Sufficient | Sufficient |
| | 30a | Good | Good | Satisfactory | Satisfactory | Satisfactory | Sufficient |
| | 31a | Good | Good | Good | Satisfactory | Satisfactory | Satisfactory |
| | 32a | Good | Good | Satisfactory | Satisfactory | Satisfactory | Sufficient |

TABLE 5

Flowability - Storage test (b-series)
Conditions:
Temperature: 25° C.
rel. humidity: 65%

| | Sample number | Flowability Weeks |  |  |  |  |  |
|---|---|---|---|---|---|---|---|
| | | 0 | 2 | 4 | 8 | 12 | 24 |
| | | European Pharmacopeia, Chapter 2.9.36, Powder Flow Flow property | | | | | |
| | | *Isomalt ST-base* | | | | | |
| Comparison | 1b | Satisfactory | Sufficient | Sufficient | Sufficient | Insufficient | Insufficient |
| | 2b | Sufficient | Sufficient | Sufficient | Insufficient | Insufficient | Insufficient |
| | 3b | Satisfactory | Satisfactory | Sufficient | Sufficient | Insufficient | Insufficient |
| | 4b | Sufficient | Sufficient | Sufficient | Insufficient | Insufficient | Insufficient |

TABLE 5-continued

Flowability - Storage test (b-series)
Conditions:
Temperature: 25° C.
rel. humidity: 65%

| | Sample number | Flowability Weeks | | | | | |
|---|---|---|---|---|---|---|---|
| | | 0 | 2 | 4 | 8 | 12 | 24 |
| | | European Pharmacopeia, Chapter 2.9.36, Powder Flow Flow property | | | | | |
| | 5b | Sufficient | Sufficient | Sufficient | Insufficient | Insufficient | Insufficient |
| | 6b | Satisfactory | Sufficient | Sufficient | Insufficient | Insufficient | Insufficient |
| | 7b | Satisfactory | Satisfactory | Sufficient | Sufficient | Insufficient | Insufficient |
| | 8b | Sufficient | Sufficient | Sufficient | Insufficient | Insufficient | Insufficient |
| | | Isomalt GS-base | | | | | |
| | 9b | Sufficient | Sufficient | Sufficient | Insufficient | Insufficient | Insufficient |
| | 10b | Satisfactory | Sufficient | Sufficient | Sufficient | Insufficient | Insufficient |
| | 11b | Satisfactory | Satisfactory | Satisfactory | Sufficient | Insufficient | Insufficient |
| | 12b | Sufficient | Sufficient | Sufficient | Insufficient | Insufficient | Insufficient |
| | 13b | Satisfactory | Sufficient | Sufficient | Sufficient | Insufficient | Insufficient |
| | 14b | Sufficient | Sufficient | Sufficient | Insufficient | Insufficient | Insufficient |
| | 15b | Sufficient | Sufficient | Sufficient | Insufficient | Insufficient | Insufficient |
| | 16b | Satisfactory | Satisfactory | Sufficient | Sufficient | Insufficient | Insufficient |
| | | Isomalt ST-base | | | | | |
| Invention | 17b | Good | Good | Good | Satisfactory | Satisfactory | Sufficient |
| | 18b | Good | Good | Satisfactory | Satisfactory | Sufficient | Sufficient |
| | 19b | Good | Satisfactory | Satisfactory | Sufficient | Sufficient | Sufficient |
| | 20b | Good | Good | Satisfactory | Satisfactory | Sufficient | Sufficient |
| | 21b | Good | Good | Good | Satisfactory | Sufficient | Sufficient |
| | 22b | Good | Satisfactory | Satisfactory | Sufficient | Sufficient | Sufficient |
| | 23b | Good | Good | Good | Satisfactory | Satisfactory | Sufficient |
| | 24b | Good | Satisfactory | Satisfactory | Satisfactory | Sufficient | Sufficient |
| | | Isomalt GS-base | | | | | |
| | 25b | Good | Good | Good | Satisfactory | Sufficient | Sufficient |
| | 26b | Good | Good | Satisfactory | Satisfactory | Sufficient | Sufficient |
| | 27b | Good | Satisfactory | Satisfactory | Satisfactory | Sufficient | Sufficient |
| | 28b | Good | Good | Satisfactory | Satisfactory | Satisfactory | Sufficient |
| | 29b | Good | Good | Good | Satisfactory | Sufficient | Sufficient |
| | 30b | Good | Satisfactory | Satisfactory | Sufficient | Sufficient | Sufficient |
| | 31b | Good | Good | Good | Satisfactory | Satisfactory | Sufficient |
| | 32b | Good | Good | Good | Satisfactory | Sufficient | Sufficient |

EXAMPLE 5

Examination of the Caking Tendency (Sample Series c):

A caking test is used to determine the flow property of the samples from the c-series. For this purpose, the samples are filled twice in a cylindrical vessel (filling height ⅔ of the total height). The samples are each covered with sheets of film and weighted down with a stamp with a mass of 1.2 kg. There is a gap of approximately 1 mm between the sample vessel and the stamp, so that an air exchange with the surroundings is possible. The filled sample vessels are stored at 25° C. and 65% relative humidity for the respective periods (2, 4, 8, 12, 24 weeks). After storage, the stamps and the film are carefully removed without damaging the product surface. The samples are emptied from the sample vessels, wherein it is assessed whether the product pours out of the vessels completely and whether there are clumps in the resulting pouring. A classification was made as follows:

| 1 | No clumps present |
| 2 | Clumps <0.5 cm |
| 3 | Clumps >0.5 cm |
| 4 | Caking throughout the product |

The results are shown in Table 6 below.

TABLE 6 rel. humidity: 65%

| | Sample number | Caking tendency Weeks | | | | |
|---|---|---|---|---|---|---|
| | | 2 | 4 | 8 | 12 | 24 |
| | | Classification | | | | |
| | | Isomalt ST-base | | | | |
| Comparison | 1c | 1 | 2 | 2 | 2 | 3 |
| | 2c | 1 | 2 | 2 | 3 | 3 |
| | 3c | 1 | 2 | 2 | 3 | 3 |
| | 4c | 1 | 2 | 2 | 2 | 3 |
| | 5c | 1 | 2 | 2 | 2 | 3 |
| | 6c | 1 | 2 | 2 | 3 | 3 |
| | 7c | 1 | 2 | 3 | 3 | 3 |
| | 8c | 1 | 2 | 2 | 3 | 3 |
| | | Isomalt GS-base | | | | |
| | 9c | 1 | 2 | 2 | 3 | 3 |
| | 10c | 1 | 2 | 2 | 3 | 3 |
| | 11c | 1 | 2 | 2 | 3 | 3 |
| | 12c | 1 | 2 | 2 | 2 | 3 |
| | 13c | 1 | 2 | 2 | 2 | 3 |
| | 14c | 1 | 2 | 3 | 3 | 3 |

TABLE 6-continued rel. humidity: 65%

| | | Caking tendency Weeks | | | | |
|---|---|---|---|---|---|---|
| | Sample number | 2 | 4 | 8 | 12 | 24 |
| | | Classification | | | | |
| | 15c | 1 | 2 | 2 | 2 | 3 |
| | 16c | 1 | 2 | 3 | 3 | 3 |
| | Isomalt ST-base | | | | | |
| Invention | 17c | 1 | 1 | 1 | 1 | 2 |
| | 18c | 1 | 1 | 1 | 1 | 2 |
| | 19c | 1 | 1 | 1 | 2 | 2 |
| | 20c | 1 | 1 | 1 | 1 | 2 |
| | 21c | 1 | 1 | 1 | 2 | 2 |
| | 22c | 1 | 1 | 1 | 2 | 2 |
| | 23c | 1 | 1 | 1 | 1 | 2 |
| | 24c | 1 | 1 | 1 | 1 | 2 |
| | Isomalt GS-base | | | | | |
| | 25c | 1 | 1 | 1 | 2 | 2 |
| | 26c | 1 | 1 | 1 | 2 | 2 |
| | 27c | 1 | 1 | 1 | 1 | 2 |
| | 28c | 1 | 1 | 1 | 2 | 2 |
| | 29c | 1 | 1 | 1 | 2 | 2 |
| | 30c | 1 | 1 | 1 | 1 | 2 |
| | 31c | 1 | 1 | 1 | 2 | 2 |
| | 32c | 1 | 1 | 1 | 1 | 2 |

For the isomalt compositions according to the invention (samples 17 to 32), a significantly smaller negative impact on the excellent flowability was observed over the storage time when compared to the comparative compositions of isomalt (samples 1 to 16), in particular, the caking tendency of the isomalt compositions according to the invention (samples 17 to 32) was lower when compared to the comparative compositions of isomalt (samples 1 to 16).

The invention claimed is:

1. A solid isomalt composition, comprising
   (a) glycosylated isomalt components 1-O-(6'-O-alpha-D-glucopyranosyl)-alpha-D-glucopyranosyl-D-mannitol (6'-g-1,1-GPM), 6-O-(6'-O-alpha-D-glucopyranosyl)-alpha-D-glucopyranosyl-D-sorbitol (6'-g-1,6-GPS), 1,6-di-O-alpha-D-glucopyranosyl-D-sorbitol (1-g-1,6-GPS), and 1,6-di-O-alpha-D-glucopyranosyl-D-mannitol (6-g-1,1-GPM), wherein the weight ratio of 6'-g-1,1-GPM:6'-g-1,6-GPS:1-g-1,6-GPS:6-g-1,1-GPM in the isomalt composition is 1:(0.7-1.3):(0.3-1.1):(1-2),
   (b) at least 15% w/w of 1-O-alpha-D-glucopyranosyl-D-mannitol (1,1-GPM),
   (c) 40% to 80% w/w of 6-O-alpha-D-glucopyranosyl-D-sorbitol (1,6-GPS),
   (d) 0.1% to 1.0% w/w of 1-O-alpha-D-glucopyranosyl-D-sorbitol (1,1-GPS),
   (e) 0.01% to 0.3% w/w of mannitol, and
   (f) 0.01% to 0.4% w/w of sorbitol, each based on the total weight of dry matter (DM) of the isomalt composition, and
   wherein the isomalt composition further comprises 2% to 6% w/w of water based on the total weight of the isomalt composition.

2. The solid isomalt composition according to claim 1, wherein the weight ratio of 6'-g-1,1-GPM:6'-g-1,6-GPS:1-g-1,6-GPS:6-g-1,1-GPM in the isomalt composition is 1:(0.8-1):(0.7-1):(1.2-1.8).

3. The solid isomalt composition according to claim 1, wherein the isomalt composition comprises 0.01 to 0.2% w/w of 6'-g-1,1-GPM, based on the total weight (DM) of the isomalt composition.

4. The solid isomalt composition according to claim 1, wherein the isomalt composition comprises 0.01 to 0.2% w/w of 6'-g-1,6-GPS, based on the total weight (DM) of the isomalt composition.

5. The solid isomalt composition according to claim 1, wherein the isomalt composition comprises 0.01 to 0.2% w/w of 1-g-1,6-GPS based on the total weight (DM) of the isomalt composition.

6. The solid isomalt composition according to claim 1, wherein the isomalt composition comprises 0.01 to 0.4% w/w of 6-g-1,1-GPM, based on the total weight (DM) of the isomalt composition.

7. The solid isomalt composition according to claim 1, wherein the isomalt composition comprises at least 86% w/w of 1,6-GPS (6-O-alpha-D-glucopyranosyl-D-sorbitol) and 1,1-GPM (1-O-alpha-D-glucopyranosyl-D-mannitol), based on the total weight (DM) of the isomalt composition.

8. The solid isomalt composition according to claim 1, wherein the isomalt composition comprises 0.01 to 2.0% w/w of deoxy disaccharide alcohols, based on the total weight (DM) of the isomalt composition.

9. The solid isomalt composition according to claim 1, wherein the isomalt composition comprises 0.01 to 2.0% w/w of glucosylglycitols, based on the total weight (DM) of the isomalt composition.

10. The solid isomalt composition according to claim 1, wherein the isomalt composition has a particle size distribution of at least 90% of the particles with a size from 100 to 1000 µm.

11. A food or luxury food product, comprising the solid isomalt composition according to claim 1.

12. The solid isomalt composition of claim 1, which comprises 40% to 55% w/w (DW) of 1,1-GPM and 40% to 60% w/w (DW) of 1,6-GPS.

13. The solid isomalt composition of claim 1, which comprises 15% to 30% w/w (DW) of 1,1-GPM and 65% to 80% w/w (DW) of 1,6-GPS.

* * * * *